(12) United States Patent
Kiekhaefer et al.

(10) Patent No.: US 8,393,547 B2
(45) Date of Patent: Mar. 12, 2013

(54) RF PROXIMITY FINANCIAL TRANSACTION CARD HAVING METALLIC FOIL LAYER(S)

(75) Inventors: John H. Kiekhaefer, Bartlett, IL (US); Nancie A. Rudolph, Geneva, IL (US)

(73) Assignee: Perfect Plastic Printing Corporation, St. Charles, IL (US)

( * ) Notice: Subject to any disclaimer, the term of this patent is extended or adjusted under 35 U.S.C. 154(b) by 469 days.

(21) Appl. No.: 12/535,880

(22) Filed: Aug. 5, 2009

(65) Prior Publication Data

US 2011/0031319 A1    Feb. 10, 2011

(51) Int. Cl.
*G06K 19/06*    (2006.01)

(52) U.S. Cl. .......................... 235/492; 235/487; 235/493

(58) Field of Classification Search .................. 235/487, 235/492, 493
See application file for complete search history.

(56) References Cited

U.S. PATENT DOCUMENTS

| | | | |
|---|---|---|---|
| 4,480,178 A | 10/1984 | Miller, II et al. | |
| 4,650,981 A | 3/1987 | Foletta | |
| 4,661,691 A | 4/1987 | Halpern | |
| 4,897,533 A | 1/1990 | Lyszczarz | |
| 5,359,323 A | 10/1994 | Michel | |
| 5,613,159 A | 3/1997 | Colnot | |
| 6,093,273 A | 7/2000 | Lee | |
| 6,147,606 A | 11/2000 | Duan | |
| 6,177,871 B1 | 1/2001 | Rasband | |
| 6,471,128 B1 | 10/2002 | Corcoran et al. | |
| 6,480,110 B2 | 11/2002 | Lee et al. | |
| 6,486,783 B1 | 11/2002 | Hausladen et al. | |
| 6,491,782 B1 | 12/2002 | Jaynes | |
| 6,581,839 B1 * | 6/2003 | Lasch et al. .................. 235/487 |
| 6,644,551 B2 * | 11/2003 | Clayman et al. .............. 235/488 |
| 6,693,541 B2 | 2/2004 | Egbert | |
| 6,749,123 B2 | 6/2004 | Lasch et al. | |
| 6,764,014 B2 | 7/2004 | Lasch et al. | |
| 6,924,026 B2 | 8/2005 | Jaynes | |
| 7,064,668 B2 | 6/2006 | Porad | |
| 7,070,112 B2 * | 7/2006 | Beenau et al. ................. 235/488 |
| 7,106,196 B2 | 9/2006 | Adams et al. | |
| 7,122,087 B2 | 10/2006 | Kanda et al. | |
| 7,126,479 B2 | 10/2006 | Claessens et al. | |
| 7,202,790 B2 | 4/2007 | Copeland et al. | |
| 7,222,798 B2 * | 5/2007 | Ortigosa Vallejo et al. .. 235/492 |
| 7,259,726 B2 * | 8/2007 | Ibi et al. ........................ 343/867 |

(Continued)

OTHER PUBLICATIONS

Wikipedia, "Smart Card", downloaded from <http://en.wikipedia.org/wiki/Smart_Card> on Mar. 3, 2009, 11 pages.

(Continued)

*Primary Examiner* — Daniel Hess
*Assistant Examiner* — Paultep Savusdiphol
(74) *Attorney, Agent, or Firm* — Walter W. Duft

(57) ABSTRACT

A contactless financial transaction card includes a plastic inlay having first and second substantially planar surfaces bounded by a continuous peripheral edge. An integrated circuit carried by the inlay stores card-specific data. An antenna carried by the inlay is operatively connected to the integrated circuit. The foil layer provides the financial transaction card with a decorative metallic reflective appearance and is constructed to permit the antenna to inductively couple with the card reader within the maximum coupling distance. Printed graphics or text may be disposed on or above the metallic foil layer. The card is constructed to inductively couple with a card reader that is spaced from the card in order to support limited-range wireless communication between the card and the card reader up to a maximum coupling distance, beyond which it will not couple.

31 Claims, 8 Drawing Sheets

U.S. PATENT DOCUMENTS

| | | | |
|---|---|---|---|
| 7,306,158 B2 * | 12/2007 | Berardi et al. | 235/492 |
| 7,315,248 B2 | 1/2008 | Egbert | |
| 7,375,639 B2 | 5/2008 | Dixon et al. | |
| 7,377,433 B2 | 5/2008 | Morley, Jr. et al. | |
| 7,378,973 B2 | 5/2008 | Dixon et al. | |
| 7,607,583 B2 * | 10/2009 | Berardi et al. | 235/487 |
| 7,837,116 B2 * | 11/2010 | Webb et al. | 235/487 |
| 7,909,258 B2 * | 3/2011 | Kim | 235/492 |
| 7,967,204 B2 * | 6/2011 | Hadley et al. | 235/451 |
| 2003/0012935 A1 * | 1/2003 | Kuntz et al. | 428/209 |
| 2003/0116633 A1 * | 6/2003 | Clayman et al. | 235/488 |
| 2003/0141373 A1 | 7/2003 | Lasch et al. | |
| 2004/0020992 A1 | 2/2004 | Lasch et al. | |
| 2004/0076803 A1 | 4/2004 | Jaynes | |
| 2004/0118930 A1 * | 6/2004 | Berardi et al. | 235/492 |
| 2005/0040242 A1 * | 2/2005 | Beenau et al. | 235/492 |
| 2005/0051633 A1 | 3/2005 | Lasch et al. | |
| 2005/0181188 A1 * | 8/2005 | Jaynes | 428/195.1 |
| 2005/0247795 A1 * | 11/2005 | Riedl et al. | 235/488 |
| 2006/0065714 A1 * | 3/2006 | Jesme | 235/380 |
| 2008/0000985 A1 * | 1/2008 | Bdeir | 235/488 |
| 2008/0106002 A1 * | 5/2008 | Feldman et al. | 264/400 |
| 2008/0197200 A1 | 8/2008 | Lasch et al. | |
| 2008/0245865 A1 * | 10/2008 | Mosteller | 235/449 |
| 2008/0296978 A1 * | 12/2008 | Finkenzeller et al. | 307/104 |
| 2009/0108061 A1 * | 4/2009 | Tartavull et al. | 235/380 |

OTHER PUBLICATIONS

E. M. Mount III, "Technology of Vacuum Metallized Plastics Packaging", Plastic Trends Net, downloaded from <http://www.plastictrends.net/index2.php?option=com_content&task=view&id=21&Itemid=1&po . . . > on Mar. 31, 2009, 4 pages.

Wikipedia, "Typical RF Applications", at least as early as Apr. 1, 2009, 1 page.

Smart Card Alliance, "Contactless Payments Glossary", downloaded from <http://www.smartcardalliance.org/resources/pdf/contackless_pmt_glossary.pdf> at least as early as Apr. 1, 2009, 2 pages.

Visa, Inc., "MasterCard and Visa Agree to a Common Contactless Communications Protocol", downloaded from <http://www.corporate.visa.com/md/nr/press252.jsp> on Mar. 3, 2009.

Atmel Corporation, "Tag Tuning/RFID", Application Note, 2002, 7 pages.

HID Global, "Achieving Optimal Read Range—It's all in the Frequency", Springe Events 2009, ICMA Card Manufacturing, 3 pages.

Shran, "Optical Density as a Function of Aluminum Thickness of a Metallized Film", at least as early as Apr. 1, 2009, 1 page.

OTI, "The Saturn Reader", at least as early as Apr. 1, 2009, 2 pages.

All Foils, Inc., "Yield—Square Feet Per Pound", at least as early as Apr. 1, 2009, 1 page.

* cited by examiner

RF PROXIMITY FINANCIAL TRANSACTION CARD HAVING METALLIC FOIL LAYER(S)

BACKGROUND

1. Field of the Invention

The present invention relates to contactless financial transaction cards embodying RF proximity components that facilitate wireless data communication with reading devices. More particularly, the invention concerns RF proximity financial transaction cards having one or more metallic foil layers designed to provide a decorative reflective surface.

2. Description of the Prior Art

By way of background, one type of contactless financial transaction card, commonly known as an RF proximity card, contains RF proximity components that allow such cards to be polled by wireless reader devices when the cards are brought into proximity therewith. However, RF proximity cards are generally functionally incompatible with the metallic foil layers that are sometimes used in financial transaction cards to provide decorative reflective surfaces. The foil layers tend to attenuate the RF signals exchanged between card and reader to the point where wireless communication is not possible at any distance from the reader. The present invention provides metallized foil financial transaction cards that can be used for RF proximity applications.

SUMMARY

An RF proximity financial transaction card includes a plastic inlay having first and second substantially planar surfaces bounded by a continuous peripheral edge. An integrated circuit carried by the inlay stores card-specific data. An antenna carried by the inlay is operatively connected to the integrated circuit. A metallic foil layer substantially overlies at least one of the substantially planar surfaces. The foil layer provides the financial transaction card with a decorative metallic reflective appearance. Printed graphics or text may be disposed on or above the metallic foil layer. The card is constructed to inductively couple with a card reader that is spaced from the card in order to support limited-range wireless communication between the card and the card reader up to a maximum coupling distance, beyond which it will not couple.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENT

Figure 1:
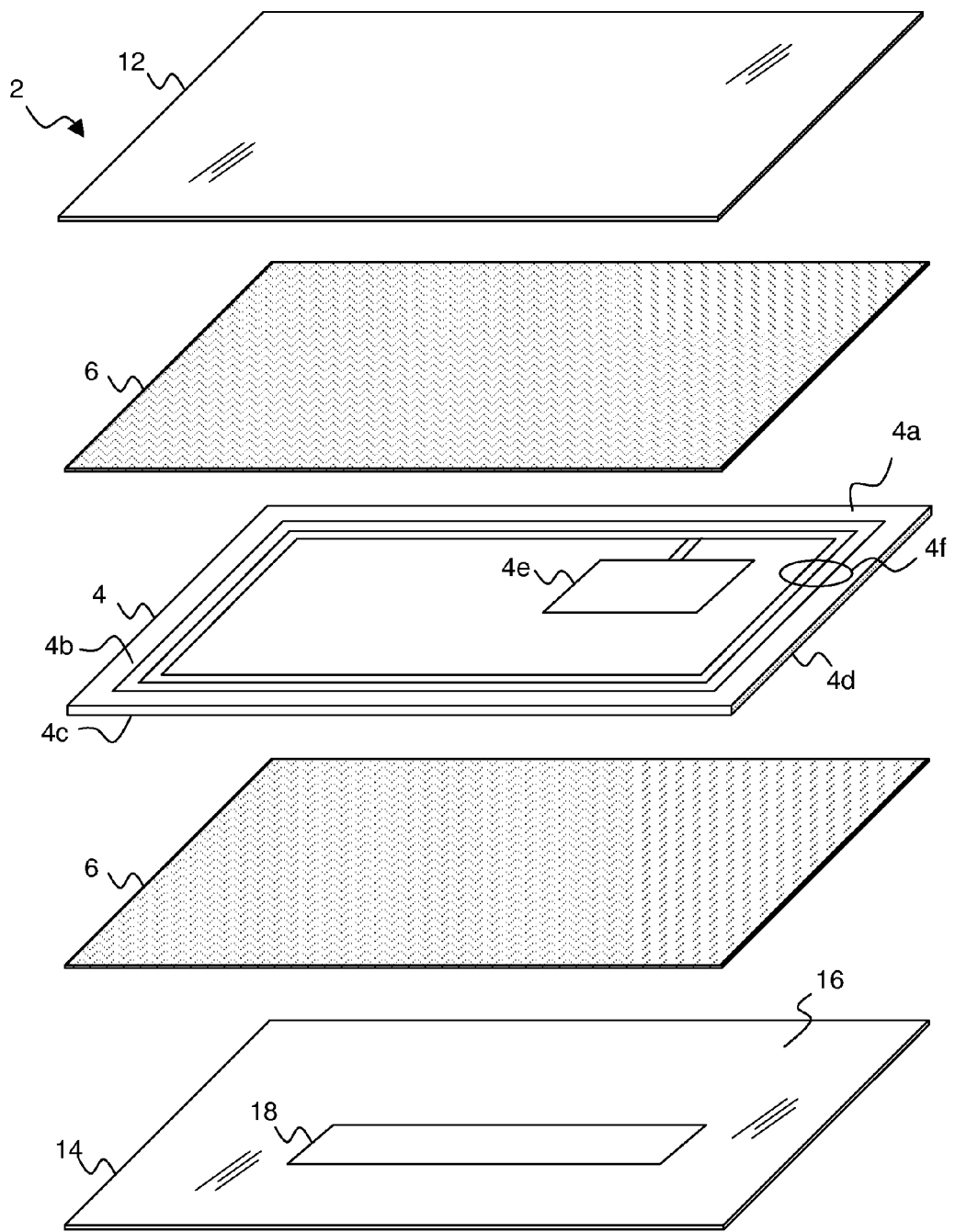
FIG. 1 is an exploded perspective view of an RF proximity financial transaction card constructed in accordance with an example embodiment.
Figure 2:
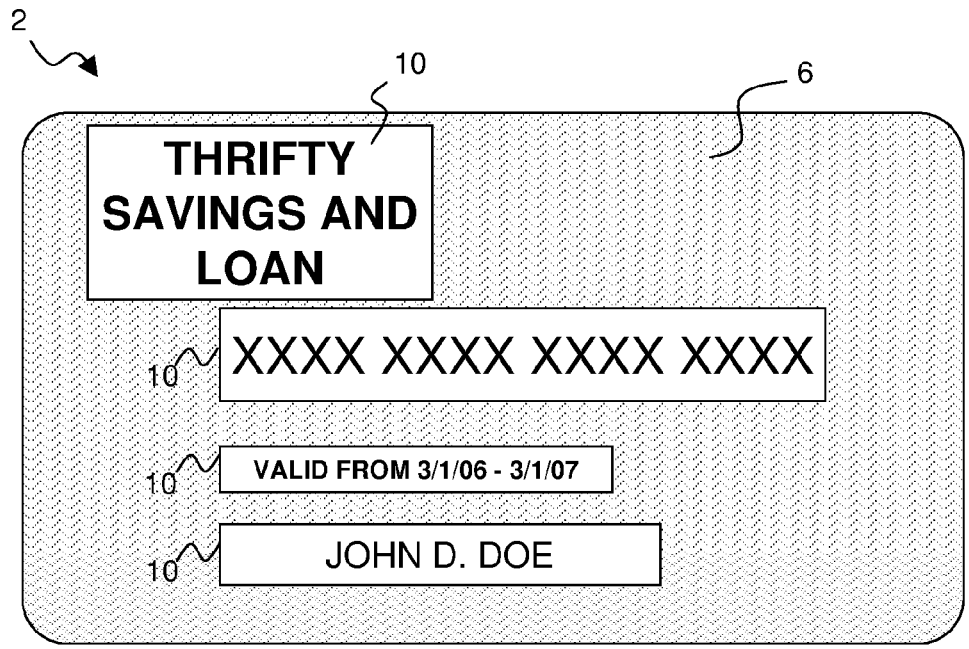
FIG. 2 is a top plan view of the RF proximity financial transaction card of FIG. 1.
Figure 3:
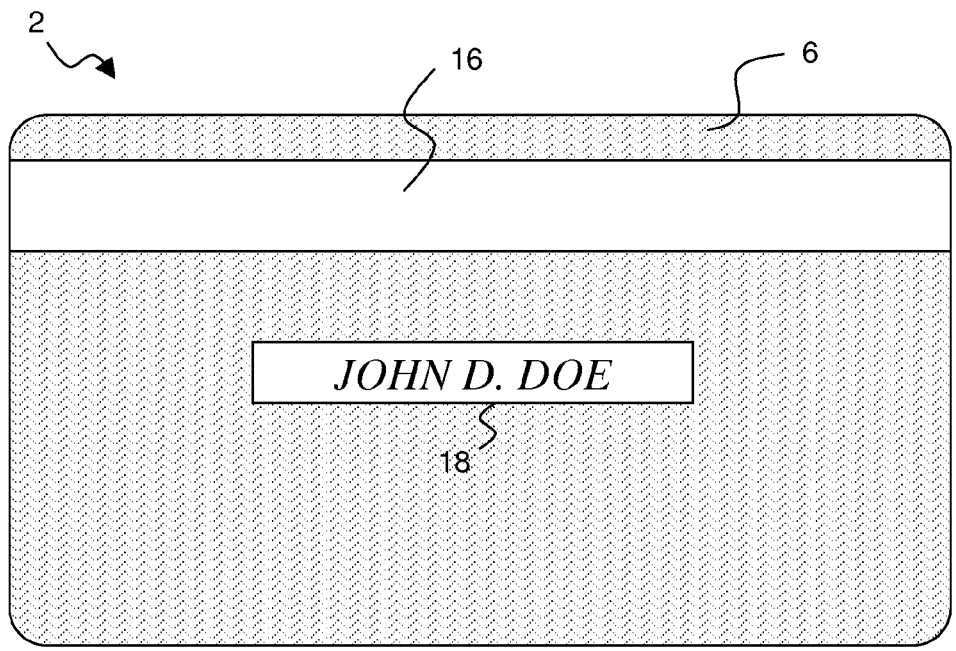
FIG. 3 is a bottom plan view of the RF proximity financial transaction card of FIG. 1.

Turning now to the figures, wherein like reference numerals are used to represent like elements in all of the several views, FIGS. 1-3 illustrate an RF proximity financial transaction card 2 constructed in accordance with an example embodiment. As used herein, a financial transaction card refers to a card having the purpose of conducting financial transactions such as a credit card, gift card, debit card, or stored value card, associated with payment. Financial transaction card physical characteristics, performance, and use may be governed by one or more of the following standards and test methods: ISO/IEC7810, ISO/IEC7811, ISO/IEC7813, and ISO/IEC 10373. A financial transaction card is typically configured as a rigid planar sheet of desired shape, typically made of plastic, having dimensions less than 5 inches×5 inches and a thickness between 0.005" and 0.100." The most typical form is rectangular and is suitable for carrying in a purse or wallet. Such cards typically measure about 2.125"×3.3 75"×0.030," and have rounded corners.

Figure 4:
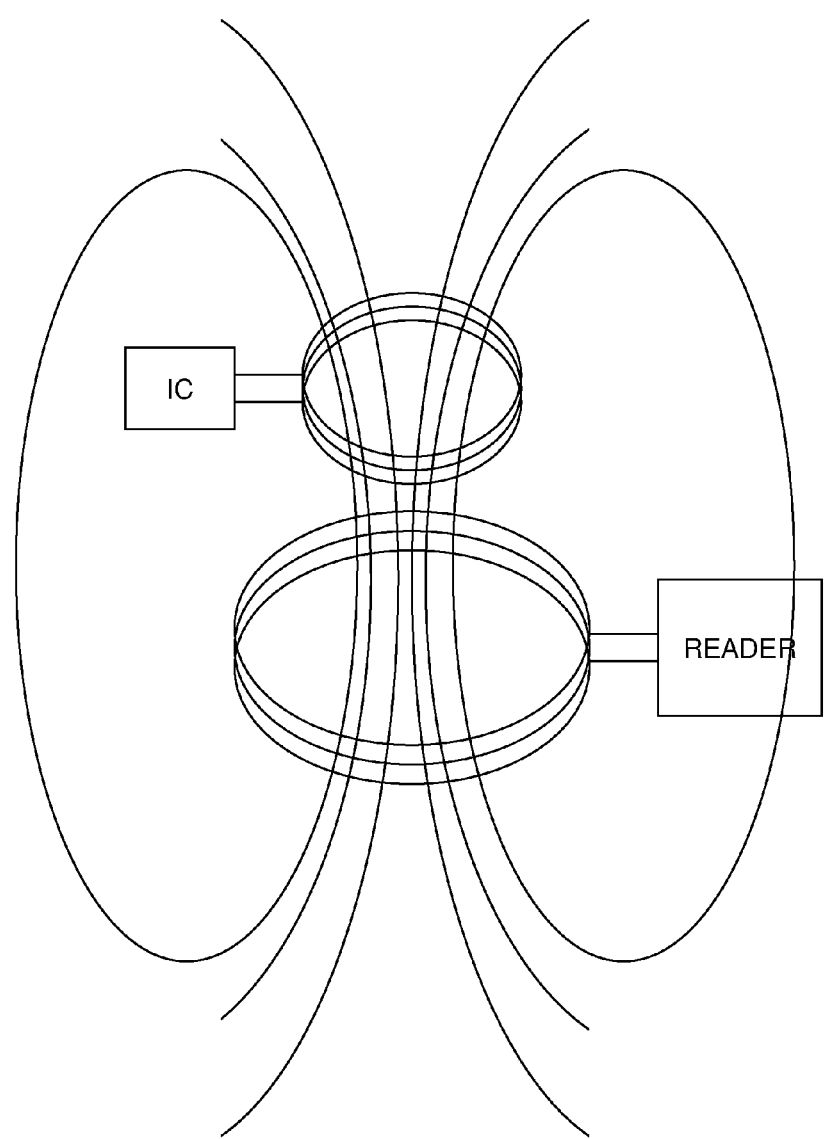
FIG. 4 is a diagrammatic view showing inductive coupling between an RF proximity financial transaction card and an RF proximity card reader.

A contactless integrated circuit (CICC) card refers to a card that contains within it an integrated circuit with data storage capability and an antenna for communicating via RF induction technology. Depending on application requirements, the integrated circuit may or may not include a microprocessor in addition to the circuit's data storage capability. Contactless cards are passive and the integrated circuit is only powered up when presented nearby to a card reading device (card reader). A card reader is a powered device for transmitting and receiving data to and from the contactless card via induction. As shown in FIG. 4, the card reader emits an electromagnetic RF field that powers the integrated circuit electronics within the card. The card antenna resonates when power is induced therein by the card reader magnetic field emissions. Digital information may then be transferred back and forth between the card and the card reader. In order for this to occur, the overall card design (including antenna, components, materials, and their arrangement) needs to be such that the card will optimally couple with the card reader.

Contactless cards may be classified according to their operating range. Three existing categories of contactless card are RF close-coupled cards for very close operation, RF proximity cards for nearby operation, and RF vicinity cards for longer distance operation. Each of these categories is governed by specifications jointly promulgated by the International Organization for Standardization (ISO) and the International Electrotechnical Commission (IEC). The current governing specification for RF close-coupled cards is ISO/

IEC 10536. This standard calls for a near surface-to-surface contact coupling range with RF close-coupled card readers that operate at a frequency of 125 kHz or 134 kHz. The current standard governing RF vicinity cards is ISO/IEC 15693. This standard calls for a coupling range of 0-1.5 meters with RF vicinity card readers that operate at a frequency of 900 MHz.

Although the card 2 may be constructed according to the above specifications governing RF close-coupled cards and RF vicinity cards, contactless financial transaction cards are most commonly constructed as RF proximity cards. The current governing specification for RF proximity cards is ISO/IEC 14443. According to this standard, the maximum coupling distance of RF proximity cards is within a range of 0-10 cm. This specification also provides that the card readers operate in the vicinity of 13.56 MHz+/−7 kHz at an RF Field Strength of 1.5-7.5 A/m rms. It should also be noted that some financial transaction card applications are set up with a maximum coupling distance within the range of 0-4 cm or a maximum coupling distance within the range of 4-10 cm, which are more stringent specifications and within the 0-10 cm range set for RF Proximity Cards.

The stated ranges for maximum coupling distance are related to practical functionality and desirable security for RF proximity card reading applications. If the card couples with the reader at a maximum distance of 4 cm or 10 cm, it couples at lesser distances from the reader as well. What is of interest is the maximum coupling distance of the card with respect to the reader. Being able to couple at distances greater than 4 cm or 10 cm may represent a security risk and may not be desirable for financial transaction card applications. For example, contactless cards in the pockets of users could potentially be scanned in an unauthorized manner if the cards were designed to couple at very large distances. On the other hand, it may also not be desirable to have a card that needs to directly contact the reader in order to couple (i.e., a coupling distance of zero). Such a card would be more difficult to use, and the use may be less reliable. It will be appreciated that the above-described specifications for RF proximity cards may be modified in the future (for example, in regard to maximum coupling distance specified for proximity applications, reader frequency and power output). The RF proximity cards disclosed herein are therefore intended to encompass all such modifications.

As shown in FIGS. 1-3, the card 2 includes an RF inlay 4 comprising a substrate 4a made of a suitable plastic material. Representative plastics that may be used include, but are not necessarily limited to, materials selected from the group consisting of polyvinyl chloride (PVC), polyethylene terephthalate glycolized (PETG), unmodified amorphous polyethylene terephthalate (APET), acrylonitrile-butadiene-styrene (ABS), general purpose polystyrene (GPPS), high impact polystyrene (HIPS), polyethylene terphthalate (PET), and combinations of the foregoing materials. The inlay 4 has first and second substantially planar surfaces 4b and 4c bounded by a continuous peripheral edge 4d. The substrate 4a carries an integrated circuit 4e for storing card-specific data and an antenna 4f operatively connected to the integrated circuit. As is conventional, these components may be bonded to or embedded within the substrate 4a. The construction details of the integrated circuit device and the antenna are well known in the art, and will not be described further herein. Such devices are readily available from commercial sources, and are generally sold as complete inlays (e.g., the inlay 4) ready for lamination into a contactless card. Assuming it is constructed in accordance with the RF proximity card ISO/IEC 14443 specification, the card 2 incorporating the integrated circuit 4e and the antenna 4f would be referred to as a PICC (Proximity Integrated Circuit Card). If the card 2 is implemented as an RF close-coupled card in accordance with the ISO/IEC 10536 specification, it would be referred to as a Close-Coupled CICC. If the card 2 is implemented as an RF vicinity card in accordance with the ISO/IEC 15963 specification, it would be referred to as a VICC (Vicinity Integrated Circuit Card).

The integrated circuit 4e stores financial information (e.g., identification data, credit data, debit data, etc.) in machine readable (e.g., digital) form. The financial transaction information could comprise an account number and/or account security information that is stored by the device, or it could comprise a code that corresponds to financial transaction information stored externally of the card (e.g., a barcode that when read allows financial transaction information associated with the card to be retrieved from a database). The antenna 4f is designed to inductively couple with an RF proximity card reader, which is spaced from the card 2 within the maximum coupling range specified by the applicable ISO/IEC standard in order to support wireless communication between the integrated circuit device 4e and the card reader. As indicated above, an RF proximity card couples with a nearby RF proximity card reader when the card antenna resonates. Power is induced in the card antenna by the magnetic field emitted from the card reader. Digital information may then be transferred back and forth between the card reader and the card. For this to happen, the card antenna and the card reader antenna need to be appropriately tuned within the environment of the card construction, reader construction, and environmental surroundings.

Designing an RF proximity card antenna involves choosing wire type, gauge, antenna shape, number of windings, circuit resistance, etc., so that the antenna transmits, receives, or resonates at the intended frequency and power. In the card 2, the antenna 4f is conventional in nature, and may be designed so that the card will inductively couple with an RF proximity card reader used for RF proximity cards according the applicable ISO/IEC 14443 specification. As shown in FIG. 1, the antenna 4f may be constructed with one or more four-sided antenna windings arranged in close proximity to each other and with the peripheral edge 4d. Other antenna designs may also be used. For example, instead of the antenna 4f extending around the entire peripheral edge 4d, it might cover only half the card 2, such that the antenna windings are proximate only to two or three sides of the peripheral edge 4d. As stated, for RF proximity cards, the maximum coupling distance for the card from an ISO/IEC 14443 compliant reader (frequency approximately 13-15.5 MHz at a field strength of approximately 1.5-7.5 A/m rms) is typically in the range of 0-10 cm or, depending on the application, specified to be more stringent, such as in the ranges of 0-4 cm or 4-10 cm.

Figure 5:
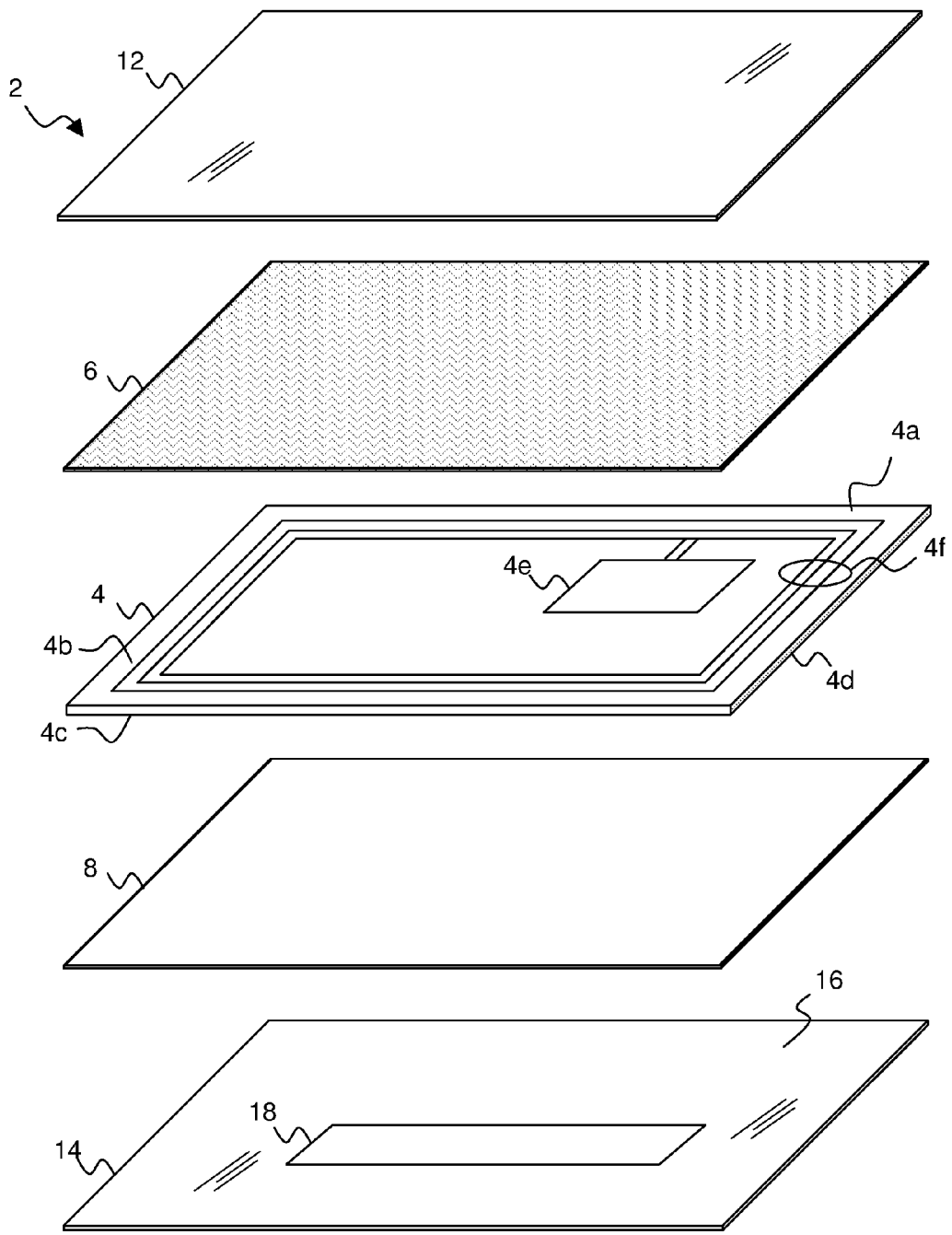
FIG. 5 is an exploded perspective view of an RF proximity financial transaction card constructed in accordance with another example embodiment.

The card 2 further includes a metallic foil layer 6 that substantially overlies at least one of the surfaces 4b or 4c. FIGS. 1-3 illustrate a two-foil layer construction wherein there are two metallic foil layers 6 that respectively cover the surfaces 4b and 4c. As additionally shown in FIG. 5, a single foil layer construction comprising only one metallic foil layer 6 may also be used. In that case, a substitute sheet 8 of desired thickness could replace the lower (or upper) metallic foil layer 6 of FIG. 1. The substitute sheet 8 may be formed using any of the plastic materials identified above in describing the inlay 4. It may be used if additional layer thickness is required in order to comply with financial transaction card size requirements. Otherwise, the substitute sheet 8 may not be required. The substitute sheet 8 may be opaque, clear (e.g.

transparent or translucent), or partially light transmissive (within the human visible light range).

As shown in FIGS. 2 and 3, printed graphics or text 10 are printed on one or both of the metallic foil layers 6 (or on the substitute sheet 8, if present). Such information could also be printed above the metallic foil layers 6 or the substitute sheet (if present), such as on an overlay sheet. In most cases, one or both of the metallic foil layers 6 (or the substitute sheet 8, if present) will have printed information and/or graphics on or above surfaces thereof. For example, these layers may be printed with a card provider name and emblems. Other graphical items may also be applied to such layers, such as decorative designs and images. The substitute sheet 8 (if present) for carrying such printing and/or decorative coatings, may be a plastic material such as vinyl with a mounted thin layer of PET (Polyethylene Terephthalate), the PET having the function of balancing the metallic foil layer opposite it in the card construction.

Completing the card 2 are a pair of conventional transparent overlay sheets 12 and 14 that can be made from any of the plastic materials identified above in describing the inlay 4. The overlay sheets 14 and 16 are used to cover and protect the printed information during card use. It is also possible to substitute for the overlay sheets using conventional press-polish coatings to also provide protection for the printed information on the card. A magnetic storage device 16 (e.g., a "mag stripe") may be optionally provided on the lower overlay 14 to store card-specific data in case an RF card reader is not available. The lower overlay 14 may also optionally carry a conventional signature panel 18. If present, the magnetic stripe 16 and the signature panel 18 may be provided on the exposed outer surface of the overlay 14. The magnetic stripe 16 may be used to store financial information (e.g., identification data, credit data, debit data, etc.) in machine readable (e.g., digital) form that can be read using a conventional card swiper. Other machine readable financial information storage or reference devices, such as barcodes, could also be present on the card 2.

The metallic foil layers 6 provide the card 2 with a decorative metallic reflective appearance. Different types of metals may be used, depending on the desired visual effect to be achieved. Examples include, but are not limited to, aluminum, copper, nickel, gold, silver, chromium, tin and lead. The metallic foil layer(s) 6 may also have any desired surface appearance or finish, including but not limited to, mirror reflective, gloss, semi-gloss, matte, rainbow, tinted, anodized, brushed, embossed, chemically etched, laser etched, holographically imaged, holographically etched, other surface treatments, and combinations thereof. The metallic foil layer(s) 6 may also have any desired color, including but not limited to aluminum, silver, gold, copper, chrome, bronze, gun-metal, charcoal, black, grey, blue, red, green and combinations thereof.

The metallic foil layer(s) 6 will thus provide a desired aesthetic characteristic of the card 2, contributing to the attractiveness of the card's graphic design and preferably conveying a favorable card issuer corporate image and providing the cardholder with a desirable personal self-image and perceived socioeconomic status. This is to be differentiated from using foil in cards for functional purposes, such as security stamps, or in antenna design. As stated, each metallic foil layer 6 substantially overlies one of the substantially planar surfaces 4b or 4c, although portions the foils layers may be selectively removed in some embodiments to support RF operation, as described in more detail below. In addition, there may be aesthetic reasons why the metallic foil layers do not completely cover the substantially planar surfaces 4b or 4c. Generally speaking, however, the goal of the metallic foil layers 6 is to provide a metallic reflective appearance across the front and/or rear face of the card 2.

Figure 6:
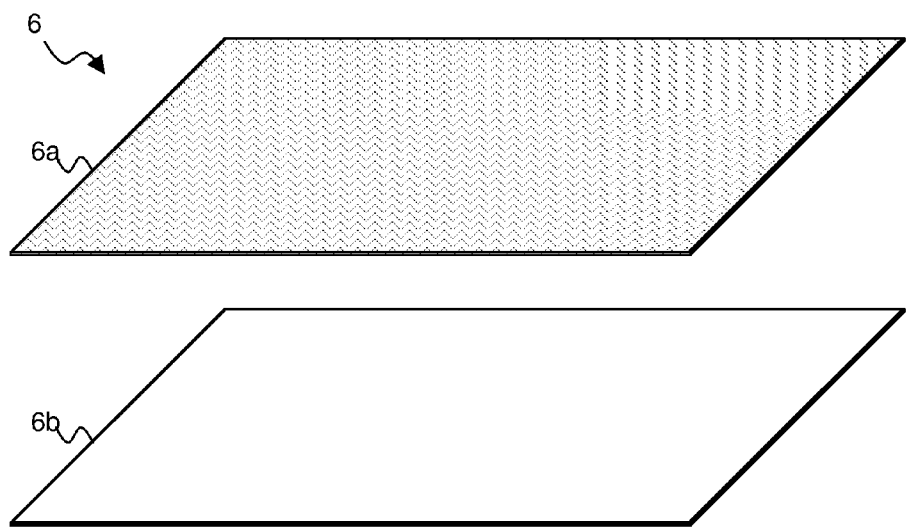
FIG. 6 is an exploded perspective view of a metallized foil layer for an RF proximity financial transaction card.

Turning now to FIG. 6, each metallic foil layer 6 may be formed as a thin metallic foil sheet material 6a bonded to a backing layer 6b. The backing layer 6b may be formed using any of the plastic materials identified above in describing the inlay 4. Such materials may be opaque or transparent. The metallic foil sheet material 6a will usually be quite thin, e.g., between about 0.05-1.5 mils. Thus, the backing layer 6b is used to facilitate material handling during card lamination. The thickness of the backing layer 6b may vary, with 6-9 mils being suitable for supporting the foil sheet material 6a.

There are at least two types of foil that may be used for the foil sheet material 6a. One is a continuous metal foil that is a self-supporting sheet of metal. Such sheets typically range in thickness from 0.5-10 mils, with 0.5-1.5 mils being most compatible with the thickness constraints on financial transaction cards (i.e., 27-33 mils). This type of metallic foil sheet material 6a can be mounted to the backing layer 6b using a suitable adhesive. Another type of foil sheet material 6a is a metallized film comprising a thin plastic sheet or film of thickness 0.15-15 mils, such as polyester, nylon, or polypropylene, which has been sputtered or vacuum metallized with one or more thin layers of continuous metal (typically aluminum or chromium) to give a reflective metallic appearance. For the card 2, a plastic film thickness of 1 mil was found to be adequate. Sputtering can lay down a continuous metal coating of 5000 Angstroms or less. Vacuum metallizing can lay down a metal coating of 1000 Angstroms or less. Vacuum metallizing and sputtering, as generally practiced, provide a continuous layer of metal mounted on the plastic. This differs from a coating of metal particles in a coating vehicle or a printed pattern of metal in an ink vehicle where the metal particles are not necessarily in contact with each other. This type of metallic foil sheet material 6a can be mounted to the backing layer 6b using a conventional heat lamination technique and adhesives.

The card 2 may be formed using a conventional lamination technique with conventional financial transaction card production lamination equipment. Currently, financial transaction cards are typically made of a multitude of plastic layers in large sheet form (e.g., from 12"×18" to 48"×48," with 22.75"×27.75" being typical). The large form sheets are laminated together in a platen press operation under heat and pressure. Multiple large form card sheets are often laminated in the platen press concurrently by interspersing pre-laminate lay-ups among sets of eleven polished rigid steel plates, with ten pre-laminate lay-ups to a lamination book, and several lamination books to a press loading (other book and press combinations are possible). A typical lamination cycle is 10-30 minutes of applied heat (e.g., 17 minutes) at a temperature of 200E-350F (e.g., 300F), followed by 10-30 minutes of cooling (e.g., 17 minutes), all under effective pressures ranging from 100 to 600 psi. After lamination, the sheets are cut into cards having a substantially rectangular shape with rounded corners and respective height and width dimensions of 2.125"×3.375" (there are also several less popular sizes). Signature panels, hologram stamps, and embossments are then added to each card.

Assuming the card 2 is to have an industry standard thickness range of approximately 30 mils (e.g., 27-33 mils), a suitable thickness range for the inlay 4 will be approximately 10-18 mils. Similarly, a suitable thickness range for the metallic foil layer(s) 6 will be approximately 7.5-10.5 mils (including the thin foil material sheet 6a and the backing layer 6b). If only one metallic foil layer 6 is present and the substitute sheet 8 is used, its thickness may be that of a standard financial transaction card core sheet, namely approximately 6-12 mils. If a PET layer is on the substitute sheet 8, its thickness range may be approximately 0.5-1.5 mils. The overlay sheets 12 and 14 may each have an industry standard thickness range of approximately 1-2 mils.

Shown below are two tables respectively illustrating example laminate layer thicknesses for the card 2 when constructed with two metallic foil layers 6 and with one such layer, respectively:

TABLE 1

Two Metallic Foil Layers

| | |
|---|---|
| Layer 1 | Clear Plastic Overlay (14): 1-2 mils |
| Layer 2a | Foil Sheet Material (6a): 0.05-1.5 mils (With printing and/or decorative coatings) |
| Layer 2b | Opaque or Clear Backing Layer (6b): 6-9 mils |
| Layer 3 | RF Inlay (4): 10-16 mils |
| Layer 4a | Opaque or Clear Backing Layer (6b): 6-9 mils |
| Layer 4b | Foil Sheet Material (6a): 0.05-1.5 mils (With printing and/or decorative coatings) |
| Layer 5 | Clear Plastic Overlay (16): 1-2 mils |

TABLE 2

One Metallic Foil Layer

| | |
|---|---|
| Layer 1 | Clear Plastic Overlay (14): 1-2 mils |
| Layer 2a | Foil Sheet Material (6a): 0.05-1.5 mils (With printing and/or decorative coatings) |
| Layer 2b | Opaque or Clear Backing Layer (6b): 6-9 mils |
| Layer 3 | RF Inlay (4): 10-16 mils |
| Layer 4a | Opaque or Clear Core Sheet (8): 6-12 mils |
| Layer 4b | PET Layer on Core Sheet: 0.5-1.5 mils (With printing and/or decorative coatings) |
| Layer 5 | Clear Plastic Overlay (16): 1-2 mils |

As stated in the Background section of this document, RF proximity financial transaction cards are generally functionally incompatible with metallic foil layers due to attenuation of the RF signals exchanged between the card and reader. Applicants believe that the mechanism of interference may be the formation of eddy currents induced in the foil by the RF signal. Applicants have discovered that the signal attenuating effect of metallic foil in an RF proximity financial transaction card can be mitigated by constructing the card 2 using certain design principles. By applying these design principles, one or more metallic foil layer(s) in an RF proximity financial transaction card may be used while still permitting the card to inductively couple with the card reader up to a desired maximum coupling distance. It has been further determined that the card construction can be varied depending on whether the foil comprises actual metal foil or a metallized film, as discussed above. For actual metal foil having a relatively high metal content, one design approach that may be used is to pattern the foil in the vicinity of the card antenna using one or more strategic cutouts. For metallized film, another design approach that may be used is to limit the metal content while maintaining a sufficient metal opacity to provide a metallic decorative effect. It is estimated that the metal thickness needed to provide a decorative effect is approximately 5 Angstroms for the metals listed above. For aluminum, which has a density of 2.7 g/cc., this thickness corresponds to a metal weight/area (metal content) of 0.000000868 g/sq. in. If the metal content of the metallized film cannot be sufficiently reduced without sacrificing decorative effect, then the patterning technique proposed for metal foil may be used.

Several examples will now be described to better illustrate the design principles summarized above. In each of the examples, RF proximity financial transaction cards (test cards) per ISO/IEC 14443 were constructed in the manner described thus far, while varying the metallic foil layers. In order to evaluate the test cards, a Saturn 3000 Reader manufactured by OnTrack Innovations (OTI) was procured. This reader is ISO/IEC14443 compliant. As described above, this is the prevailing standard for RF proximity cards. The reader has a flat 4.50"×2.75" antenna sensor. When an ISO/IEC 14443 compliant card is placed parallel to the sensor, in a range somewhere between 0-10.0 cm, the reader emits an audible beep signifying a successful coupling of the reader with the card. The test cards were evaluated by measuring the maximum distance away from the sensor surface a card can be placed and yet still return the audible beep signifying coupling with the reader. The test cards were mounted on a horizontal plane, and the antenna sensor of the reader was raised and lowered via a lab jack to precisely adjust and measure the distance between the card and reader.

Figure 7:
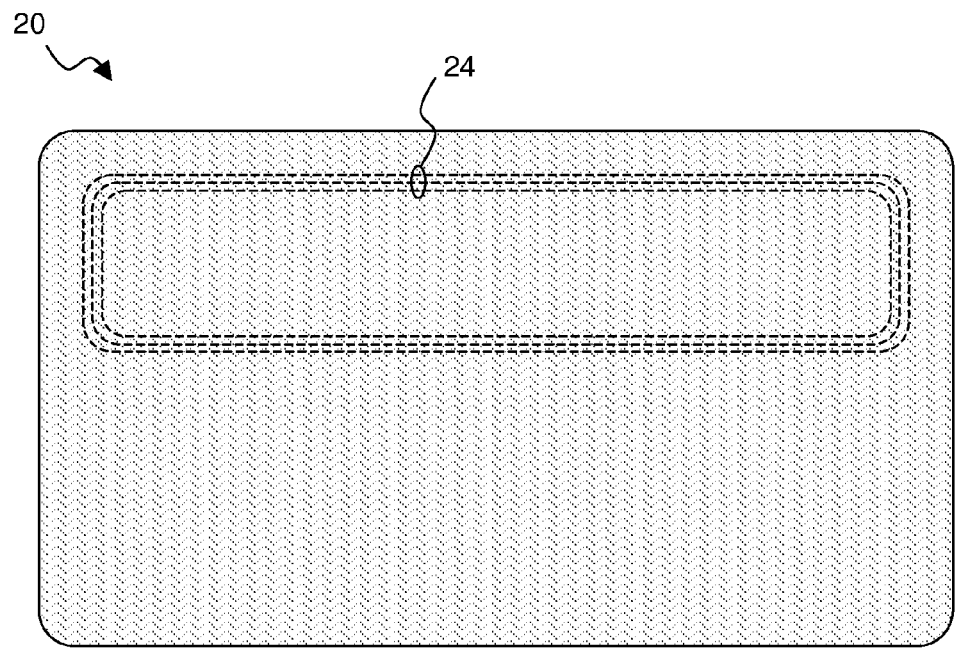
FIG. 7 is a plan view showing an example antenna configuration for an RF proximity financial transaction card.

I. Examples Based On Metal Foil Cards the following examples are all based on cards whose metallic foil layers use actual metal foil, namely aluminum foil having a thickness ranging between 0.22-1.50 mils obtained from Republic Foil Inc. The RF inlay was obtained from Inside Contactless Corporation, product designation Micropass L4-2G. The card 20 shown in FIG. 7 illustrates the shape of the antenna for this RF inlay (shown by reference number 24). The plastic layers were constructed using PVC overlay film and corestock materials obtained from Klockner Pentaplast GmbH.

EXAMPLE 1

Cards with Full-Face Metal Foil Material

In this example, four cards with different thicknesses of aluminum foil completely covering one card face were produced and tested. The design model for each card was as follows:

| | |
|---|---|
| Layer 1 | Klockner Pentaplast SB6 vinyl overlay film with adhesive facing aluminum foil: 1.5 mils |
| Layer 2 | Republic Foil aluminum foil: 0.22-1.50 mils |
| Layer 3 | Klockner Pentaplast SB6 vinyl film with adhesive facing aluminum foil: 1.5 mils (With printing and/or decorative coatings) |
| Layer 4 | Micropass L4-2G RF inlay: 15 mils |
| Layer 5 | Klockner Pentaplast clear vinyl corestock: 8 mils |

The four cards evaluated in this example had respective foil thicknesses of 0.22, 0.35, 0.60 and 1.50 mils. Based on the density of aluminum, the foregoing foil thicknesses correspond to a metal weight/area of 0.00957 g/sq. in., 0.015489 g/sq. in., 0.026552 g./sq. in., and 0.66380 g./sq. in., respectively. None of these cards with a full face metal foil material were able to achieve coupling with the card reader at any distance, indicating total blockage of RF communication between the card and the ISO compliant reader for all thicknesses of aluminum foil practically available commercially.

EXAMPLE 2

Cards with Patterned Metal Foil Material

In this example, three cards with three different cutout patterns in the otherwise full-face aluminum foil were produced and tested. The foil thickness was 0.22 mils and the metal weight/area was 0.00957 g/sq. in. for all cards. The design model for each card was as follows:

| Layer 1 | Republic Foil aluminum foil: 0.22 mils |
| --- | --- |
| Layer 2 | Klockner Pentaplast SB6 vinyl film: 1.5 mils |
| Layer 3 | Klockner Pentaplast printed white vinyl corestock: 6 mils |
| Layer 4 | Micropass L4-2G RF inlay: 15 mils |
| Layer 5 | Klockner Pentaplast printed white vinyl corestock: 6 mils |
| Layer 6 | Klockner Pentaplast SB6 vinyl overlay film: 1.5 mils |

Figure 8:
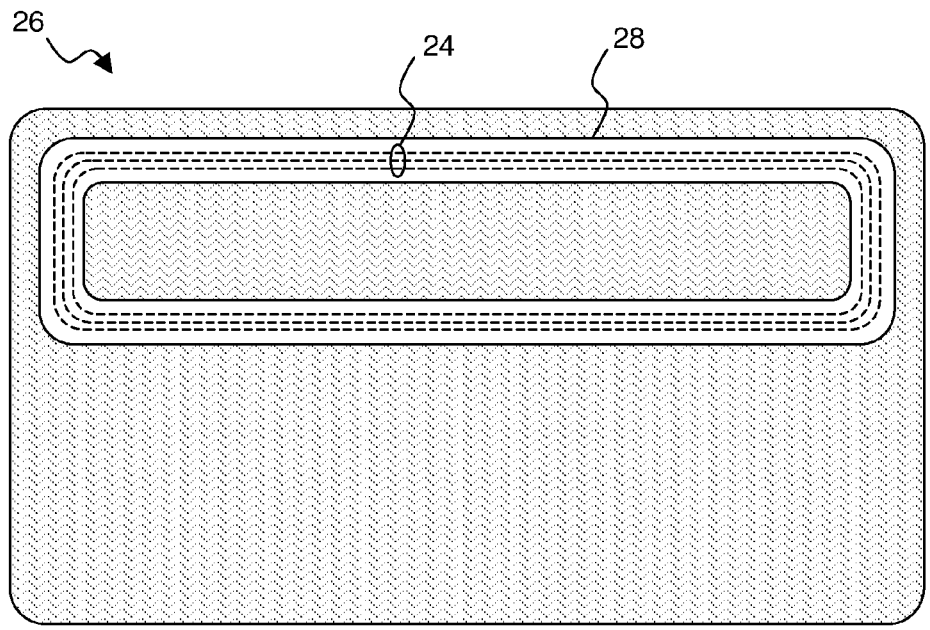
FIG. 8 is a plan view showing an RF proximity financial transaction card having a metallized foil layer that has been patterned with an example cutout in the vicinity of the antenna.

The card 26 in FIG. 8 is representative of the first card evaluated in this example. The metal foil material is patterned with a cutout 28 that is shaped, sized and located to conform to the windings of the antenna 24. It was found that this card is capable of coupling with the card reader up to a distance of 4.0 cm, which is a maximum distance that is within the ISO 14443 range for an RF proximity card. The maximum coupling distance was the same regardless of whether the foil side of the card was facing toward or away from the card reader.

Figure 9:
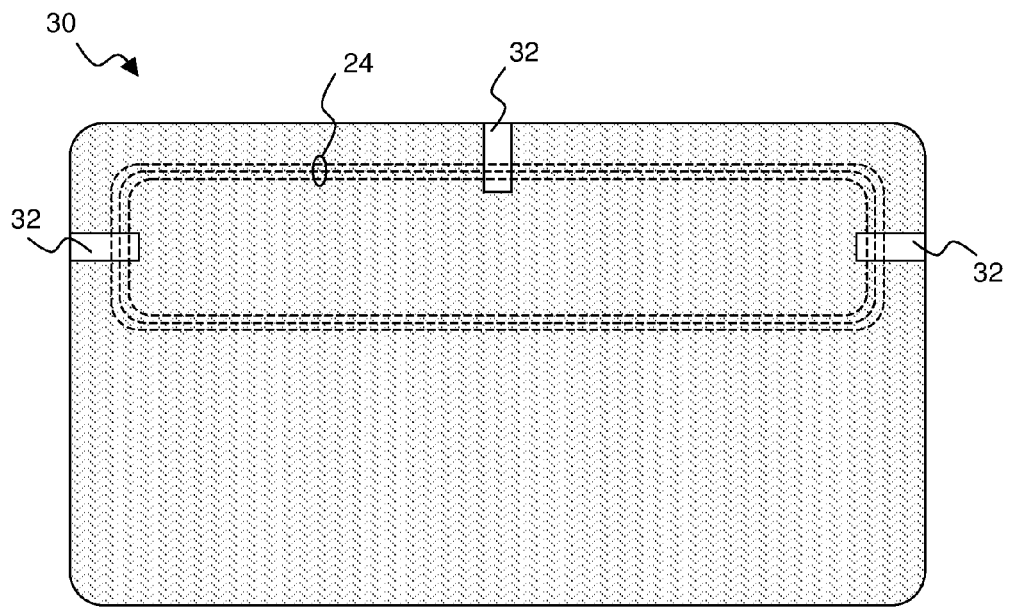
FIG. 9 is a plan view showing an RF proximity financial transaction card having a metallized foil layer that has been patterned with another example cutout in the vicinity of the antenna.

The card 30 in FIG. 9 is representative of the second card evaluated in this example. The metal foil material is patterned with cutouts 32 that are shaped as notches that cross the windings of the antenna 24. It was found that this card is capable of coupling with the card reader up to a distance of 2.0 cm, which is a maximum distance that is within the ISO 14443 range for an RF proximity card. The maximum coupling distance was the same regardless of whether the foil side of the card was facing toward or away from the card reader.

Figure 10:
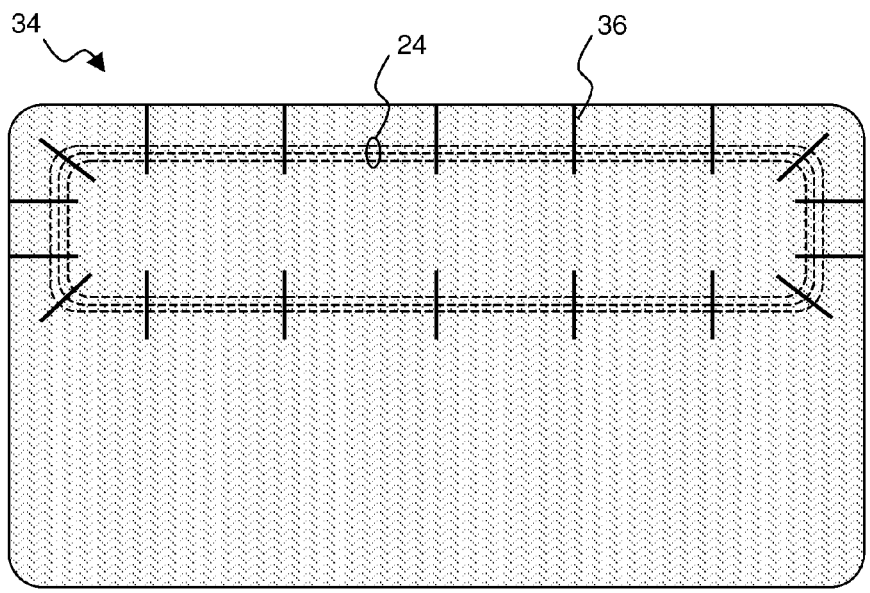
FIG. 10 is a plan view showing an RF proximity financial transaction card having a metallized foil layer that has been patterned with another example cutout in the vicinity of the antenna.

The card 34 in FIG. 10 is representative of the third card evaluated in this example. The metal foil material is patterned with cutouts 36 that are shaped as slits that cross the windings of the antenna 24. It was found that this card is capable of coupling with the card reader up to a distance of 2.0 cm, which is a maximum distance that is within the ISO 14443 range for an RF proximity card. The maximum coupling distance was the same regardless of whether the foil side of the card was facing toward or away from the card reader.

Based on this example, it would be expected that other cutout patterns in the metal foil material would produce similarly acceptable coupling distances. The shape, size, orientation and number of such patterns may be determined by routine experiment using the guidance provided by the present disclosure.

II. Examples Based on Metallized Film Cards

Figure 11:
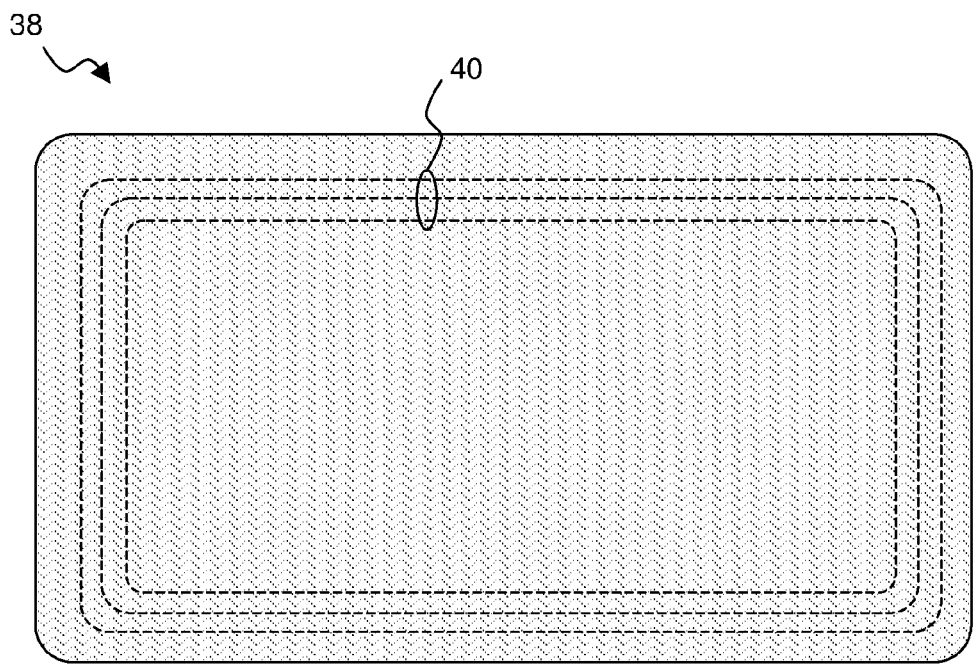
FIG. 11 is a plan view showing another example antenna configuration for an RF proximity financial transaction card.
Figure 12:
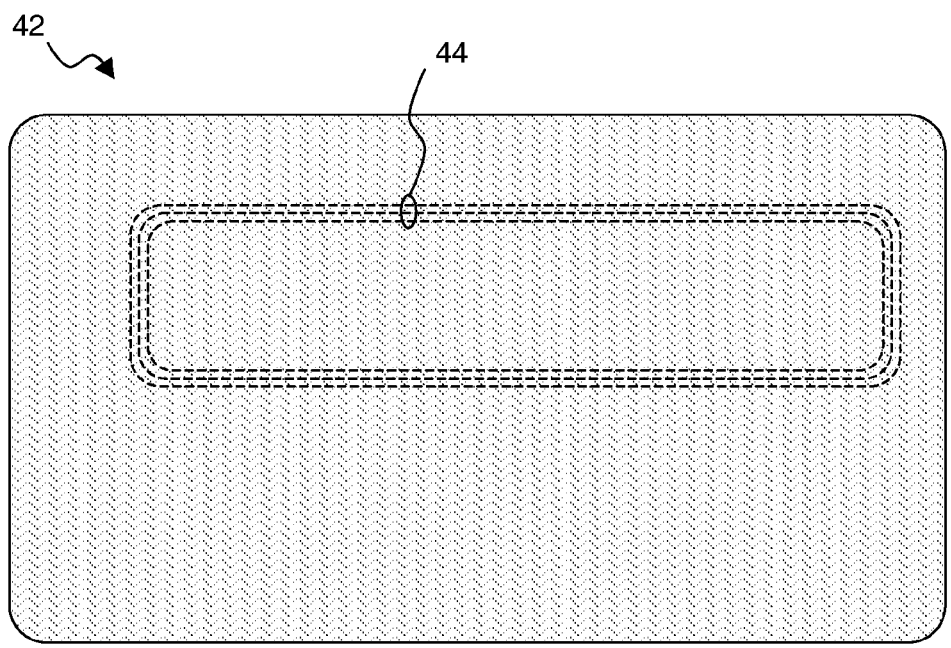
FIG. 12 is a plan view showing another example antenna configuration for an RF proximity financial transaction card.

The following examples are all based on cards whose metallic foil layers include metallized film. Three different types of metallized film were used with varying numbers of layers to adjust the metal content. One metallized film was an aluminum metallized PET film, product designation PL10, from Composecure LLC. The two other metallized films were aluminum films from JDSU Corporation, product designations JDSU WS08-225 and JDSU WS07-253. Three different types of RF inlay were also used. One RF inlay was obtained from Inside Contactless Corporation, product designation Micropass L4-2G. The card 20 shown in FIG. 7 illustrates the shape of the antenna for this RF inlay. Another RF inlay was obtained from Inside Contactless Corporation, product designation Micropass L4-2.5G. The card 38 shown in FIG. 11 illustrates the shape of the antenna for this RF inlay (shown by reference number 40). The third RF inlay was obtained from Texas Instruments, Corporation, product designation CLOA-PPPC060202-170408. The card 42 shown in FIG. 12 illustrates the shape of the antenna for this RF inlay (shown by reference number 44). The plastic layers were constructed using PVC overlay film and corestock materials obtained from Klockner Pentaplast GmbH.

EXAMPLE 3

Cards With 1-8 Layers of Metallized Film Material

In this example, multiple cards with different numbers of metallized film layers were evaluated to determine how maximum RF coupling distance changed as the metal content increased. For cards with two or more metallized film layers, one set of cards had metallized film on only one side of the card and another set of cards had metallized film on both sides of the card. The design model for the two-sided metallized film cards is shown below. The one-sided metallized film cards were of the same construction but lacked layer 5:

| Layer 1 | Composecure PL10 aluminum metallized PET film with bonded vinyl layers: zero or more layers @ 10 mils per layer |
| --- | --- |
| Layer 2 | Klockner Pentaplast SB6 vinyl film with adhesive: 1.5 mils |
| Layer 3 | Micropass L4-2G RF inlay: 15 mils |
| Layer 4 | Klockner Pentaplast SB6 vinyl film with adhesive: 1.5 mils |
| Layer 5 | Composecure PL10 aluminum metallized PET film with bonded vinyl layers: zero or more layers @ 10 mils per layer |

Each metallized film layer was calculated to have a metal thickness of 80 Angstroms (based on published data relating opacity to thickness for metallized aluminum film) and a metal weight/area of 0.000014 g/sq. in. (based on the density of aluminum). The maximum RF coupling distances for each card were as follows:

| Number of Metallized Film Layers | Metal Thickness (Angstroms) | Metal Weight/Area (g/sq. in.) | Coupling Distance (cm) Foil - One Side | Coupling Distance (cm) Foil - Two Sides |
| --- | --- | --- | --- | --- |
| 0 | 0 | 0 | 6.0 | 6.0 |
| 1 | 80 | 0.000014 | 5.8 | — |
| 2 | 160 | 0.000028 | 5.5 | 5.5 |
| 3 | 240 | 0.000042 | 5.0 | 4.4 |
| 4 | 320 | 0.000055 | 4.2 | 4.3 |
| 5 | 400 | 0.000069 | 3.6 | 3.9 |
| 6 | 480 | 0.000083 | 3.4 | 3.2 |
| 7 | 560 | 0.000097 | 3.0 | 2.1 |
| 8 | 640 | 0.000111 | 2.7 | 2.0 |
| 9 | 720 | 0.000125 | No Coupling | No Coupling |

In the case of this experiment, a primary factor in the measured coupling distances is the inlay characteristics. Without any metal layer involvement, the baseline performance of the inlay in the card samples allows it to couple with the ISO compliant reader at distances of 6.0 cm or less (a maximum coupling distance of 6.0 cm.) Based on the foregoing data, it is estimated that the no coupling point (failure to couple at any distance) of the card with the reader for this experiment was reached at a metal thickness in the card of 680 Angstroms and a metal weight/area of approximately 0.000118 g/sq. in. The estimated metal thickness and content where the card fails to couple with the reader at a distance of 4 cm and beyond was estimated to be 347 Angstroms and a metal weight/area of approximately 0.000060 g/sq. in. Insofar as the metal thickness needed to provide a decorative effect is estimated to be approximately 5 Angstroms, it can be seen that in the case of this experiment, such a card design with that minimal metal laydown, would still couple with the reader at distances of just under 6 cm and below.

EXAMPLE 4

Cards with Single Layer of Metallized Film Material

In this example, the metallized aluminum film was the JDSU WS08-225 material and the RF inlay was the Inside Contactless Micropass L4-2.5G. The bottom core (substitute layer 4a/4b) was a prelaminated composite identified as JDSU WSO8-226 made of a thin 1 mil PET film bonded to a 5 mil clear PVC corestock. The card design model was based on Table 2 presented above, with the card having a single metallized film layer. The precise lay-up was as follows:

| | |
|---|---|
| Layer 1 | Klockner Pentaplast SB6 vinyl overlay film: 1.5 mils |
| Layer 2a | JDSU WS08-225 metallized film: 1 mil (With holographic image) |
| Layer 2b | JDSU WS08-225 vinyl coresheet backing: 5 mils |
| Layer 3 | Inside Contactless Micropass L4-2.5G RF Inlay: 16 mils |
| Layer 4a | JDSU WSO8-226 vinyl corestock backing: |
| Layer 4b | JDSU WSO8-226 PET film layer: 1 mil |
| Layer 5 | Klockner Pentaplast SB6 vinyl overlay film: 1.5 mils |

The calculated metal layer thickness for layer 2a was 53 Angstroms (based on published data relating opacity to thickness for metallized aluminum film). Based on the density of aluminum, it is estimated that the metal weight/area was 0.000009147 g/sq. in. This card coupled with the ISO compliant card reader up to a distance of 7.8 cm, which is approximately 8 cm and consistent with the ISO 14443 requirements. Again, in this example, the exact distance range of coupling between the card and the ISO compliant reader is determined by the inlay performance characteristics and the metal content in the continuous metallic layer.

EXAMPLE 5

Card with Single Layer of Metallized Film Material

In this example, the metallized aluminum film was the JDSU WS07-253 material and the RF inlay was the Texas Instruments CLOA-PPPC060201-170408. The bottom core (substitute layer 4) was a Boltaron White Tru Print 3045-1796 white PVC corestock. This sheet has a full coverage of 12% Spectraflair 1500-14 Pearl in a vehicle of Apollo 510840 vinyl screen coating which was applied with a 305-mesh screen. The coating has the effect of balancing the metallized film on the top foil/corestock, thus preventing the cards from bowing. The card design model was based on Table 2 presented above, with the card having a single metallized film layer. The precise lay-up was as follows:

| | |
|---|---|
| Layer 1 | Klockner Pentaplast SB6 vinyl overlay film: 1.5 mils |
| Layer 2a | JDSU WS07-253 metallized film: 1 mil (With holographic image) |
| Layer 2b | JDSU WS07-253 vinyl coresheet backing: 5 mils |
| Layer 3 | TI CLOA-PPPC060201-170408 RF Inlay: 15 mils |
| Layer 4 | Boltaron White Tru Print 3045-1796 vinyl corestock: 6 mils |
| Layer 5 | Klockner Pentaplast vinyl overlay film: 1.5 mils |

The calculated metal layer thickness for layer 2a was 60 Angstroms (based on published data relating opacity to thickness for metallized aluminum film). Based on the density of aluminum, it is estimated that the metal weight/area was 0.000010355 g/sq. in. This card coupled with the card reader up to a distance of 7.8 cm, which is approximately 8 cm and consistent with the ISO 14443 requirements.

EXAMPLE 6

Card with Two Layers of Metallized Film Material

In this example, the metallized aluminum film was the JDSU WS07-253 material and the RF inlay was the Inside Contactless L4-2.5G. The card design model was based on Table 1 presented above, with the card having two metallized film layers. The precise lay-up was as follows:

| | |
|---|---|
| Layer 1 | Klockner Pentaplast SB6 vinyl overlay film: 1.5 mils |
| Layer 2a | JDSU WS07-253 metallized film: 1 mil |
| Layer 2b | JDSU WS07-253 vinyl coresheet backing: 5 mils |
| Layer 3 | TI CLOA-PPPC060201-170408 RF Inlay: 15 mils |
| Layer 4a | JDSU WS07-253 vinyl coresheet backing: 5 mils |
| Layer 4b | JDSU WS07-253 metallized film: 1 mil |
| Layer 5 | Klockner Pentaplast SB6 vinyl overlay film: 1.5 mils |

The calculated metal layer thickness for layers 2a and 4b were 60 Angstroms each (based on published data relating opacity to thickness for metallized aluminum film). Based on the density of aluminum, it is estimated that the metal weight/area was 0.000010355 g/sq. in. This card coupled with the ISO compliant card reader up to a distance of 5.0 cm. Again, in this example, the exact distance range of coupling between the card and the ISO compliant reader is determined by the inlay performance characteristics and the metal content in the continuous metallic layer.

Accordingly, an RF proximity financial transaction card having one or more decorative metallic foil layers has been disclosed. Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. An RF proximity financial transaction card, comprising:
a plastic inlay having first and second substantially planar surfaces bounded by a continuous peripheral edge;
an integrated circuit carried by said inlay storing card-specific data;
an antenna carried by said inlay that is operatively connected to said integrated circuit;
a metallic foil layer having a peripheral edge that is substantially coextensive with said continuous peripheral edge of said plastic inlay, said metallic foil layer substantially overlying at least one of said substantially planar surfaces such that said metallic foil layer provides said financial transaction card with a decorative metallic reflective appearance across one or both of a front or rear face of said card;

printed graphics or text on or above said metallic foil layer; and said card being constructed to inductively couple with an RF proximity card reader that is spaced from said card in order to support limited-range wireless communication between the card and the card reader up to a maximum coupling distance, beyond which said card will not couple.

2. The RF proximity financial transaction card of claim 1, additionally including a magnetic storage device storing card specific data.

3. The RF proximity financial transaction card of claim 1, additionally including a signature panel.

4. The RF proximity financial transaction card of claim 1, wherein there is a single one of said metallic foil layers that includes a plastic backing layer supporting a metal layer, said metallic foil layer overlying a first one of said substantially planar surfaces, and wherein said financial transaction card further comprises a substitute plastic substrate overlying a second one of said substantially planar surfaces.

5. The RF proximity financial transaction card of claim 1, wherein there are two of said metallic foil layers that each include a plastic backing layer supporting a metal layer, said metallic foil layers respectively overlying said first and second substantially planar surfaces.

6. The RF proximity financial transaction card of claim 1, further including one or more additional protective plastic layers or protective press-polish coatings respectively overlying said metallic foil layer and said first and second substantially planar surfaces.

7. The RF proximity financial transaction card of claim 1, wherein said maximum coupling distance is less than approximately 10 cm.

8. The RF proximity financial transaction card of claim 1, wherein said maximum coupling distance is less than approximately 4 cm.

9. The RF proximity financial transaction card of claim 1, wherein said maximum coupling distance is between approximately 4 and 10 cm.

10. The RF proximity financial transaction card of claim 1, wherein said maximum coupling distance is approximately 8 cm.

11. The RF proximity financial transaction card of claim 1, wherein said card is designed to inductively couple with said card reader operating at a frequency of approximately 13-17.5 MHz.

12. The RF proximity financial transaction card of claim 1, wherein said card is designed to inductively couple with said card reader operating at a frequency of approximately 13-17.5 MHz and at approximately 1.5-7.5 A/m rms field strength.

13. The RF proximity transaction card of claim 1, wherein said antenna comprises one or more four-sided antenna windings arranged in proximity to said peripheral edge on at least two sides thereof.

14. The RF proximity transaction card of claim 1, wherein said antenna comprises one or more four-sided antenna windings arranged in proximity to said peripheral edge on four sides thereof.

15. The RF proximity financial transaction card of claim 1, wherein said metallic foil layer has a surface appearance or finish that is selected from the group consisting of mirror reflective, gloss, semi-gloss, matte, rainbow, tinted, anodized, brushed, embossed, chemically etched, laser etched, holographically imaged, holographically etched, and combinations of any of the foregoing, and wherein said metallic foil layer has a color selected from the group consisting of aluminum, silver, gold, copper, chrome, bronze, gun-metal, charcoal, black, grey, blue, red, green and combinations of any of the foregoing.

16. The RF proximity transaction card of claim 1, wherein said metallic foil layer comprises metal selected from the group consisting of aluminum, copper, nickel, gold, silver, chromium, tin and lead.

17. The RF proximity transaction card of claim 1, wherein said metallic foil layer comprises a self-supporting metal foil sheet having a metal thickness of approximately 0.2-10 mils.

18. The RF proximity financial transaction card of claim 17, wherein said metallic foil layer is selectively patterned with one or more cutouts in the vicinity of said antenna.

19. The RF proximity financial transaction card of claim 18, wherein said one or more cutouts include a cutout that is shaped, sized and located to conform to said antenna.

20. The RF proximity financial transaction card of claim 18, wherein said one or more cutouts are shaped as notches that cross said antenna.

21. The RF proximity financial transaction card of claim 18, wherein said one or more cutouts are shaped as slits that cross said antenna.

22. The RF proximity financial transaction card of claim 1, wherein said metallic foil layer comprises a plastic substrate having a continuous metal coating vacuum deposited or sputtered thereon.

23. The RF proximity financial transaction card of claim 22, wherein said metallic foil layer comprises a plastic substrate having a continuous metal coating vacuum deposited thereon at a thickness of approximately 5-1000 Angstroms or sputtered thereon at a thickness of approximately 5-5000 Angstroms.

24. The RF proximity financial transaction card of claim 22, wherein said metal coating has a metal weight/area of approximately 0.000111 g/sq, in, or less.

25. The RF proximity financial transaction card of claim 22, wherein said metal coating comprises aluminum and has a thickness of approximately 5-640 Angstroms.

26. The RF proximity financial transaction card of claim 22, wherein said metal coating comprises aluminum and has a thickness of approximately 5-350 Angstroms.

27. The RF proximity financial transaction card of claim 22, wherein said metal coating is patterned as necessary in the vicinity of said antenna if said metal coating is too thick to otherwise allow said card to couple to said reader.

28. The RF proximity financial transaction card of claim 22, wherein said metal coating is selected from the group consisting of aluminum, copper, nickel, gold, silver, chromium, tin and lead or combinations thereof.

29. An RF contactless financial transaction card, comprising:

a plastic inlay having first and second substantially planar surfaces bounded by a continuous peripheral edge;

an integrated circuit carried by said inlay storing card-specific data;

an antenna carried by said inlay that is operatively connected to said integrated circuit;

said antenna including one or more four-sided antenna windings arranged in proximity to said peripheral edge on least two, three or four sides thereof;

a metallic foil layer substantially overlying at least one of said substantially planar surfaces, said foil layer providing said financial transaction card with a decorative metallic reflective appearance;

said card being constructed to inductively couple with an RF card reader that is spaced from said card in order to support limited-range wireless communication between said card and said card reader up to a maximum coupling distance of approximately 10 cm, beyond which said card will not couple with said card reader, said card reader operating at a frequency of approximately 13-17.5 MHz and at approximately 1.5-7.5 A/m rms field strength;

said metallic foil layer having a surface appearance/finish that is selected from the group consisting of mirror reflective, gloss, semi-gloss, matte, rainbow, tinted, anodized, embossed, chemically etched, laser etched, holographically imaged, holographically etched, or combinations of any of the foregoing;

said metallic foil layer further having a color selected from the group consisting of aluminum, silver, gold, copper, chrome, bronze, gun-metal, charcoal, black, grey, blue, red, green and combinations of any of the foregoing;

said metallic foil layer comprising a metal selected from the group consisting of aluminum, copper, nickel, gold, silver, chromium, tin and lead;

said metallic foil layer comprising a self-supporting metal foil sheet having a metal thickness of approximately 0.2-10 mils;

said metallic foil layer being selectively patterned with one or more cutouts in the vicinity of said antenna;

said one or more cutouts being selected from the group consisting of (1) a cutout that is shaped, sized and located to conform to said antenna windings, (2) cutouts that are shaped as notches that cross said antenna windings, and (3) cutouts that are shaped as slits that cross said antenna windings;

said card having one of (1) a single one of said metallic layer that includes a plastic backing layer overlying a first one of said substantially planar surfaces, and a substitute plastic layer overlying a second one of said substantially planar surfaces, or (2) two of said metallic layers that each include a plastic backing layer respectively overlying said first and second substantially planar surfaces;

said card having one or more additional protective plastic layers or protective press-polish coatings respectively overlying said metallic layer and said first and second substantially planar surfaces; and printed graphics or text on or overlying said metallic foil layer.

30. An RF contactless financial transaction card, comprising:

a plastic inlay having first and second substantially planar surfaces bounded by a continuous peripheral edge;

an integrated circuit carried by said inlay storing card-specific data;

an antenna carried by said inlay that is operatively connected to said integrated circuit;

said antenna including one or more four-sided antenna windings arranged in proximity to said peripheral edge on least two, three or four sides thereof;

a metallic foil layer having a peripheral edge that is substantially coextensive with said continuous peripheral edge of said plastic inlay, said metallic foil layer substantially overlying at least one of said substantially planar surfaces such that said foil layer provides said financial transaction card with a decorative metallic reflective appearance across one or both of a front or rear face of said card;

said card being constructed to inductively couple with an RF card reader that is spaced from said financial transaction card in order to support limited-range wireless communication between said card and said card reader up to a maximum coupling distance of approximately 10 cm, beyond which said card will not couple with said card reader, said card reader operating at a frequency of approximately 13-17.5 MHz and at approximately 1.5-7.5 Nm rms field strength;

said metallic foil layer having a surface appearance/finish that is selected from the group consisting of mirror reflective, gloss, semi-gloss, matte, rainbow, tinted, anodized, embossed, chemically etched, laser etched, holographically imaged, holographically etched, or combinations of any of the foregoing;

said metallic foil layer further having color selected from a group consisting of aluminum, silver, gold, copper, chrome, bronze, gun-metal, charcoal, black, grey, blue, red, green and combinations of any of the foregoing;

said metallic foil layer comprising a metal selected from the group consisting of aluminum, copper, nickel, gold, silver, chromium, tin and lead;

said metallic foil layer comprising a plastic substrate having a metal coating vacuum deposited or sputtered thereon having a metal weight/area of approximately 0.000000868-0.000111 g/sq. in.;

said card having one of (1) a single one of said metallic layer that includes a plastic backing layer overlying a first one of said substantially planar surfaces, and a substitute plastic layer overlying a second one of said substantially planar surfaces, or (2) two of said metallic layers that each include a plastic backing layer respectively overlying said first and second substantially planar surfaces;

said card having one or more additional protective plastic layers or protective press-polish coatings respectively overlying said metallic layer and said first and second substantially planar surfaces; and printed graphics or text on or overlying said metallic foil layer.

31. An RF contactless financial transaction card, comprising:

a plastic inlay having first and second substantially planar surfaces bounded by a continuous peripheral edge;

an integrated circuit carried by said inlay storing card-specific data;

an antenna carried by said inlay that is operatively connected to said integrated circuit;

said antenna including one or more four-sided antenna windings arranged in proximity to said peripheral edge on least two, three or four sides thereof;

a metallic foil layer substantially overlying at least one of said substantially planar surfaces, said foil layer providing said financial transaction card with a decorative metallic reflective appearance and being constructed to permit said antenna to inductively couple with said card reader within said maximum coupling distance;

said card being constructed to inductively couple with an RF card reader that is spaced from said card in order to support limited-range wireless communication between said card and said card reader up to a maximum coupling distance of approximately 10 cm, beyond which said card will not couple with said card reader, said card reader operating at a frequency of approximately 13-17.5 MHz and at approximately 1.5-7.5 A/m rms field strength;

said metallic foil layer having a surface appearance/finish that is selected from the group consisting of mirror reflective, gloss, semi-gloss, matte, rainbow, tinted, anodized, embossed, chemically etched, laser etched, holographically imaged, holographically etched, or combinations of any of the foregoing;

said metallic foil layer further having color selected from a group consisting of aluminum, silver, gold, copper, chrome, bronze, gun-metal, charcoal, black, grey, blue, red, green and combinations of any of the foregoing;

said metallic foil layer comprising a metal selected from the group consisting of aluminum, copper, nickel, gold, silver, chromium, tin and lead;

said metallic foil layer comprising a plastic substrate having a metal coating vacuum deposited thereon to a thickness of approximately 5-1000 Angstroms or sputtered thereon to a thickness of approximately 5-5000 Angstroms;

said metallic foil layer being selectively patterned with one or more cutouts in the vicinity of said antenna;

said one or more cutouts being selected from the group consisting of (1) a cutout that is shaped, sized and located to conform to said antenna windings, (2) cutouts that are shaped as notches that cross said antenna windings, and (3) cutouts that are shaped as slits that cross said antenna windings;

said card having one of (1) a single one of said metallic layer that includes a plastic backing layer overlying a first one of said substantially planar surfaces, and a substitute plastic layer overlying a second one of said substantially planar surfaces, or (2) two of said metallic layers that each include a plastic backing layer respectively overlying said first and second substantially planar surfaces;

said card having additional protective plastic layers or protective press-polish coatings respectively overlying said metallic layers and first and second substantially planar surfaces; and printed graphics or text on or overlying said metallic foil layer.

\* \* \* \* \*